(12) United States Patent
Saito et al.

(10) Patent No.: US 7,857,464 B2
(45) Date of Patent: Dec. 28, 2010

(54) PROJECTION IMAGE POSITION ADJUSTMENT METHOD

(75) Inventors: Toshiki Saito, Suwa (JP); Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1220 days.

(21) Appl. No.: 11/426,539

(22) Filed: Jun. 26, 2006

(65) Prior Publication Data

US 2006/0290890 A1 Dec. 28, 2006

(30) Foreign Application Priority Data

Jun. 27, 2005 (JP) ............... 2005-186159
Aug. 1, 2005 (JP) ............... 2005-222524

(51) Int. Cl.
*G03B 21/26* (2006.01)
(52) U.S. Cl. ........................... 353/94; 348/744
(58) Field of Classification Search ............ 353/94; 348/744, 745
See application file for complete search history.

(56) References Cited

U.S. PATENT DOCUMENTS

| | | | |
|---|---|---|---|
| 6,222,593 B1 * | 4/2001 | Higurashi et al. | 348/745 |
| 6,471,355 B1 * | 10/2002 | Monson et al. | 353/30 |
| 6,695,451 B1 | 2/2004 | Yamasaki et al. | |
| 6,853,354 B2 | 2/2005 | Asamura | |
| 7,114,813 B2 | 10/2006 | Wada et al. | |
| 2008/0259223 A1 * | 10/2008 | Read et al. | 348/745 |

FOREIGN PATENT DOCUMENTS

| | | |
|---|---|---|
| CN | 1543207 A | 11/2004 |
| JP | A-2001-356005 | 12/2001 |
| JP | A-2002-215122 | 7/2002 |
| JP | A-2002-365718 | 12/2002 |
| JP | A-2004-72623 | 3/2004 |
| JP | A-2005-165224 | 6/2005 |
| WO | WO99/31877 | 6/1999 |

* cited by examiner

*Primary Examiner*—Georgia Y Epps
*Assistant Examiner*—Jerry Brooks
(74) *Attorney, Agent, or Firm*—Oliff & Berridge, PLC

(57) ABSTRACT

A projection image position adjustment method of applying position adjustment to, using two adjustment images, two projection images on a projection surface projected to have an overlay area by two of a plurality of projectors in a multi-projection display. The method includes: a first step of providing, to the two projectors, two adjustment image data respectively corresponding to the two adjustment images each showing a pattern of specific characteristics in the overlay area when the two adjustment images are projected with an appropriate positional relationship; a second step of calculating an evaluation value correlated to the characteristics based on image capture data that is derived by capturing an image of the projection surface with the two adjustment images projected thereon by the two projectors; and a third step of subjecting the two projection images to the position adjustment based on the evaluation values.

13 Claims, 13 Drawing Sheets

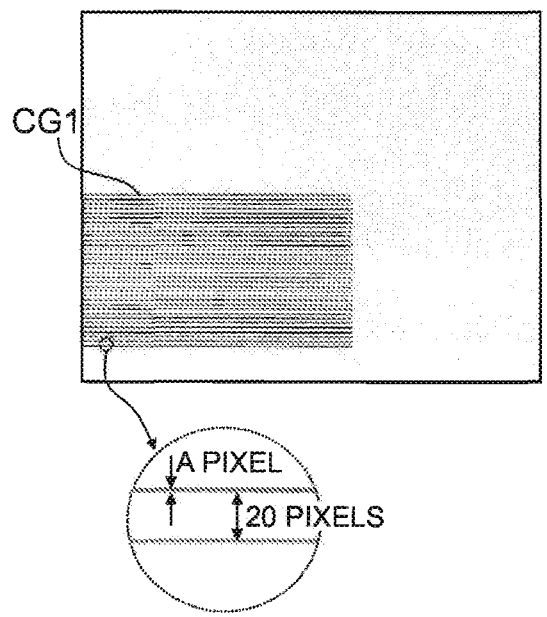
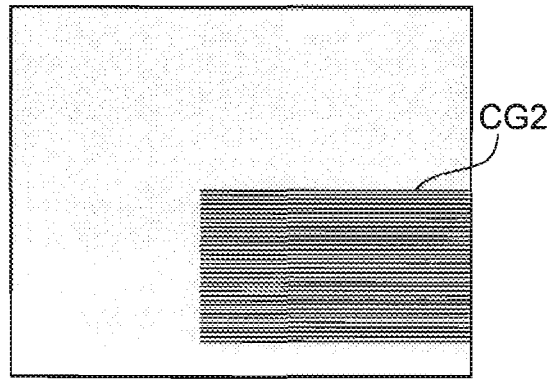
FIG. 3A  FIG. 3B
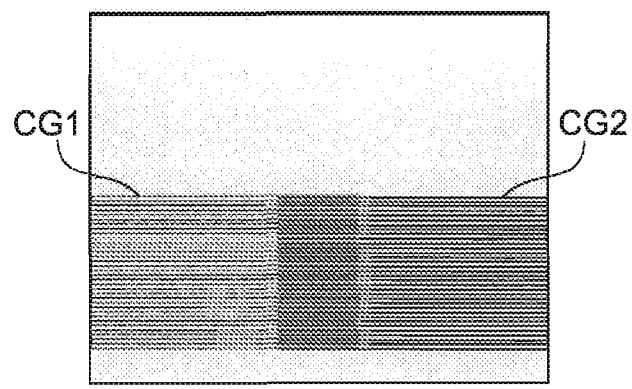
FIG. 4

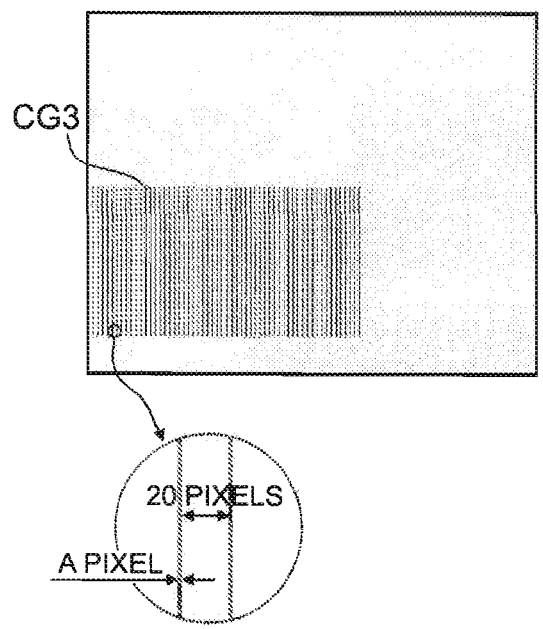 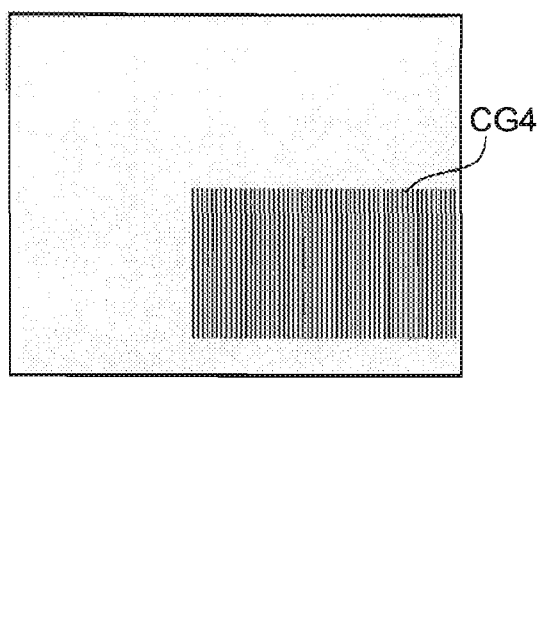
FIG. 9A  FIG. 9B
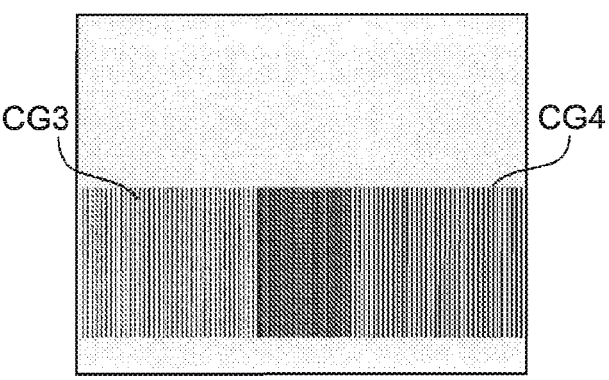
FIG.10

(i) (ii)

(i) (ii)

PROJECTION IMAGE POSITION ADJUSTMENT METHOD

This application claims priority from JP 2005-186159 and JP 2005-222524, filed in the Japanese Patent Office on Jun. 27, 2005, and Aug. 1, 2005 respectively, the entire disclosures of which are hereby incorporated by reference.

BACKGROUND

1. Technical Field

The present invention relates to a projection image position adjustment method, device, and program for use for a multi-projection display that configures a screen with projection images projected on a projection surface by a plurality of projectors, and the multi-projection display.

2. Related Art

The multi-projection display of a known type subjects projection images from a plurality of projectors to tile projection or stack projection on a projection surface. In such a multi-projection display, the quality of the projection images is dependent on the accuracy of position adjustment applied to the projection images on the projection surface.

With tile projection, for example, when the position adjustment is made with poor accuracy, the projection images are failed to be seamless or the overlay area looks blurred, thereby considerably lowering the quality of the projection images.

To solve such a problem, the position adjustment on the multi-protection display is absolutely needed for the projection images. However, this causes another problem of requiring much time and effort if users manually make such position adjustment, and in this case, such position adjustment requires rich experience in the course.

In consideration thereof, various types of technique of automating the position adjustment have been so far proposed. For example, refer to Patent Document 1 (JP-A-2001-356005), and patent Document 2 (JP-A-2002-365718).

The technique of Patent Document 1 is of measuring the type of position displacement in the following manner. That is, a plurality of test pattern images projected on a projection surface are captured by a camera. The test pattern images each show a brightness distribution of mountain-shaped waveform. From each of a plurality of test patterns in the resulting image capture data, a typical position, i.e., center position of the mountain-shaped waveform, is derived. Based on the resulting typical positions, derived are an interval between the test patterns, and an interval between points of intersection in either the horizontal or vertical direction or in both directions. The points of intersection are those between the line segment connecting the respective test patterns and the adjacent screen. The resulting intervals are used as a basis to measure the type of position displacement.

The technique of Patent Document 2 is of performing position adjustment in the following manner. That is, two adjustment patterns are displayed by two projectors, and their overlay area is displayed with a dark line. The adjustment patterns are each provided with a black display portion along a border portion with its adjacent projection image, and a white display portion inside of the black display portion. The black display portion is reduced in width by degrees, and a camera performs image capture in the course of such width reduction. The resulting image capture data is used to observe the width change of the dark line, and the position at which the dark line is disappeared is stored as a border position. The border position is used as a basis for the position adjustment, i.e., the contours of the projection images from the projectors are adjusted to come at the border position.

The technique of Patent Document 1 may detect any position displacement as long as an image capture device in use is lower in resolution than projection images, but such displacement detection requires complex image analysis. This thus requires an image data processor for use to have high throughput, and even with high throughput, the position adjustment cannot be made at high speed due to heavy calculation load.

The technique of Patent Document 2 has a problem not being able to derive a border position with high accuracy unless using a high-resolution image capture device, i.e., the pixel resolution of a projection image.

SUMMARY

An advantage of some aspects of the invention is to provide a projection image position adjustment method, device, program, and a multi-projection display, all of which enable high-speed and highly-accurate position adjustment of projection images projected on a projection surface by a plurality of projectors with less calculation load.

First Aspect

A first aspect of the invention is directed to a projection image position adjustment method of applying position adjustment to, using two adjustment images, two projection images on a projection surface projected to have an overlay area by two of a plurality of projectors in a multi-projection display. The method includes: a first step of providing, to the two projectors, two adjustment image data respectively corresponding to the two adjustment images each showing a pattern of specific characteristics in the overlay area when the two adjustment images are projected with an appropriate positional relationship; a second step of calculating an evaluation value correlated to the characteristics based on image capture data that is derived by capturing an image of the projection surface with the two adjustment images projected thereon by the two projectors; and a third step of subjecting the two projection images to the position adjustment based on the evaluation value.

As such, two projectors are used to project, on a projection surface, adjustment images showing predetermined characteristics in their overlay area when the images are projected with any appropriate positional relationship. Thus projected two adjustment images are then captured so that the image capture data is derived. The image capture data is used as a basis to calculate an evaluation value correlated to the characteristics, and based on the evaluation value, position adjustment is performed. This accordingly leads to high-speed and highly-accurate position adjustment of the projection images with less calculation load.

Alternatively, as to the two adjustment images, an adjustment image may be generated for use as two adjustment images, and thus generated two adjustment images may be provided to two projectors. Still alternatively, an adjustment image may be generated for use as an adjustment image, and the resulting adjustment image may be divided for provision to two projectors.

Second Aspect

According to the projection image position adjustment method of a second aspect, in the first aspect, preferably, in the second step, after at least one of the two adjustment images is moved in a horizontal or vertical direction on a pixel-by-pixel basis, the evaluation value is calculated every time the adjustment image is moved on a pixel-by-pixel basis.

This allows to calculate an evaluation value every time the adjustment image is moved on a pixel-by-pixel basis so that the position adjustment can be made with the accuracy down to a pixel.

Third Aspect

According to the projection image position adjustment method of a third aspect, in the first or second aspect, preferably, the pattern is of a line drawing with a width corresponding to a pixel.

As such, the two adjustment images each have a pattern of a line drawing with the width of a pixel so that the characteristics appearing as a result of pattern overlay can be observed every time the adjustment image is moved on a pixel-by-pixel basis. In this manner, the evaluation value can be appropriately calculated on a pixel basis so that the position adjustment can be made with the accuracy down to a pixel.

Fourth Aspect

According to the projection image position adjustment method of a fourth aspect, in any one of the first to third aspects, preferably, the characteristics are of a pixel value in the image capture data.

As such, by representing the characteristics by pixel values, the characteristics can be represented by objective values.

Fifth Aspect

According to the projection image position adjustment method of a fifth aspect, in the fourth aspect, preferably, the evaluation value is the number of pixels having the pixel value of a threshold value or larger, and in the third step, the two projection images are subjected to the position adjustment based on optimum projection positions of the two projection images at which the number of pixels having the pixel value of the threshold value or larger is the largest.

As such, only by representing an evaluation value by the number of pixels having the pixel value of a threshold value or larger, and by counting the number of pixels, a determination can be appropriately made with ease to find an optimum projection position. That is, since the number of pixels having the pixel value of a threshold value or larger becomes larger as the degree of overlaying of the two adjustment images becomes larger, a determination can be appropriately made with ease to find an optimum projection position.

Sixth Aspect

According to the projection image position adjustment method of a sixth aspect, in the fifth aspect, preferably, the threshold value is set to a value corresponding to a color that firstly appears when the patterns of the two adjustment images are overlaid on each other.

In this manner, pattern overlay of the two adjustment images generates a color different from those of the adjustment images so that the degree of color change visually tells the extent of position adjustment.

Seventh Aspect

According to the projection image position adjustment method of a seventh aspect, in the sixth aspect, preferably, one of the two adjustment images has a first pattern of a first color, and the other adjustment image has a second pattern of a second color. The first and second colors are each set with values for a red component, a green component, and a blue component in the two adjustment images to derive a color of white when the first and second patterns are overlaid on each other.

As such, by value setting to the color components of R (red), G (green), and B (blue) in such a manner that the pattern overlay area between the two adjustment images displays a color of white, the color of white is made to appear only when the two adjustment images are appropriately overlaid on each other.

Eighth Aspect

According to the projection image position adjustment method of an eighth aspect, in the seventh aspect, preferably, in the first color, the intensity of the red component is relatively high, and the intensity of the green component is relatively low, and in the second color, the intensity of the blue component is relatively high, and the intensity of the green component is relatively low.

This means the color of white emerges through overlay of two adjustment images, e.g., when an adjustment image including pixel values (tone values) of R=255, G=128, and B=0 is overlaid with another adjustment image including pixel values (tone values) of R=0, G=128, and B=255, emerged is the color of white including pixel values (tone values) of R=255, G=255, and B=255. Note here that the image capture data may show a change of brightness characteristics as is affected by the gamma characteristics or lighting condition of projectors or image capture devices, some lighting condition may change the pixel value of G (green).

Ninth Aspect

According to the projection image position adjustment method of a ninth aspect, in any one of the first to eighth aspects, preferably, in the second step, the evaluation value is calculated by performing image capture for a plurality of times in a state that the two adjustment images share the same positional relationship.

As such, by calculating an evaluation value using the image capture data derived through image capture for a plurality of times, the resulting evaluation value is highly accurate and is less affected by noise of the image capture device. For example, the evaluation values calculated using image capture data as a result of image capture for a plurality of times are averaged, and thus calculated average value may be used as a final evaluation value.

Tenth Aspect

According to the projection image position adjustment method of a tenth aspect, in any one of the first to ninth aspects, preferably, in the third step, the two projection images are subjected to the position adjustment by moving, on a pixel-by-pixel basis, an effective image display area of an image formation area in an electrooptic modulator provided to either of the two projectors.

As such, utilizing the functions originally provided to the projectors enables to move the projection images on a pixel-by-pixel basis.

Eleventh Aspect

An eleventh aspect of the invention is directed to a projection image position adjustment device for applying position adjustment to, using two adjustment images, two projection images on a projection surface projected to have an overlay area by two of a plurality of projectors in a multi-projection display. The device includes: an adjustment image data output device that is capable of outputting, to the two projectors, two adjustment image data respectively corresponding to the two adjustment images each showing a pattern of specific characteristics in the overlay area when the two adjustment images are projected with an appropriate positional relationship; an image capture device that is capable of capturing the two adjustment images projected on the projection surface; an evaluation value calculation device that calculates an evaluation value correlated to the characteristics based on image capture data that is derived by the image capture device capturing an image of the projection surface with the two adjustment images projected thereon by the two projectors;

and a position adjustment control device that subjects the two projection images to the position adjustment based on the evaluation value.

Such a projection image position adjustment device also leads to effects similar to those of the projection image position adjustment method of the first aspect. Note that the projection image position adjustment device is preferably provided also with the characteristics similar to those of the projection image position adjustment methods of the second to tenth aspects.

Twelfth Aspect

A twelfth aspect of the invention is directed to a projection image position adjustment program of applying position adjustment to, using two adjustment images, two projection images on a projection surface projected to have an overlay area by two of a plurality of projectors in a multi-projection display. The program includes, in a procedure: a first step of providing, to the two projectors, two adjustment image data respectively corresponding to the two adjustment images each showing a pattern of specific characteristics in the overlay area when the two adjustment images are projected with an appropriate positional relationship; a second step of calculating an evaluation value correlated to the characteristics based on image capture data that is derived by capturing an image of the projection surface with the two adjustment images projected thereon by the two projectors; and a third step of subjecting the two projection images to the position adjustment based on the evaluation value.

Such a projection image position adjustment program also leads to effects similar to those of the projection image position adjustment method of the first aspect. Note that the projection image position adjustment program is preferably provided also with the characteristics similar to those of the projection image position adjustment methods of the second to tenth aspects.

Thirteenth Aspect

A thirteenth aspect of the invention is directed to a multi-projection display including a plurality of projectors, and is capable of projecting, on a projection surface, projection images from the projectors to have an overlay area. The display includes: an adjustment image data output device that is capable of outputting, to the two projectors, when two adjustment images projected by any two of the projectors are projected with an appropriate positional relationship, two adjustment image data respectively corresponding to the two adjustment images each showing a pattern of specific characteristics in the overlay area; an evaluation value calculation device that calculates an evaluation value correlated to the characteristics based on image capture data that is derived by capturing an image of the projection surface with the two adjustment images projected thereon by the two projectors; and a position adjustment control device that subjects the two projection images to the position adjustment based on the evaluation value.

With such a configuration of the multi-projection display including a plurality of projectors for position adjustment, the projection images coming from the projectors can be adjusted in position at high speed with high accuracy. Note that the multi-projection display is preferably provided also with the characteristics similar to those of the projection image position adjustment methods of the second to tenth aspects.

Fourteenth Aspect

According to the multi-projection display of a fourteenth aspect, in the thirteenth aspect, preferably, the projection images from the projectors are preferably configured to be ready for tile projection to have the overlay area on the projection surface.

As such, also in such a multi-projection display that applies tile projection with the overlay area partially between any adjacent projection images projected by a plurality of projectors, the projection images coming from the projectors can be adjusted in position at high speed with high accuracy and less calculation load.

Fifteenth Aspect

According to the multi-projection display of a fifteenth aspect, in the thirteenth aspect, preferably, the projection images from the projectors are preferably configured to be ready for stack projection to have the overlay area on the projection surface.

As such, also in such a multi-projection display that applies stack projection with which projection images coming from a plurality of projector are so projected that one projection image is overlaid on another, the projection images from the projectors can be adjusted in position at high speed with high accuracy and less calculation load.

BRIEF DESCRIPTION OF THE DRAWINGS

The invention will be described with reference to the accompanying drawings, wherein like numbers reference like elements.

FIGS. 3A and 3B are diagrams showing, respectively, exemplary adjustment images CG1 and CG2 projected on a screen SCR separately from two projectors PJ1 and PJ2 disposed horizontally in a row.

FIG. 4 is a schematic diagram showing the state in which the adjustment images CG1 and CG2 of FIGS. 3A and 3B are projected on the screen SCR with an overlay area partially therebetween.

FIGS. 9A and 9B are schematic diagrams showing, respectively, exemplary adjustment images CG3 and CG4 projected on the screen SCR separately from the two projectors PJ1 and PJ2 disposed horizontally in a row.

FIG. 10 is a schematic diagram showing the state in which the adjustment images CG3 and CG4 of FIGS. 9A and 9B are projected on the screen SCR with an overlay area partially therebetween.

DESCRIPTION OF EXEMPLARY EMBODIMENTS

Embodiments of the invention are described below.

First Embodiment

Figure 1:
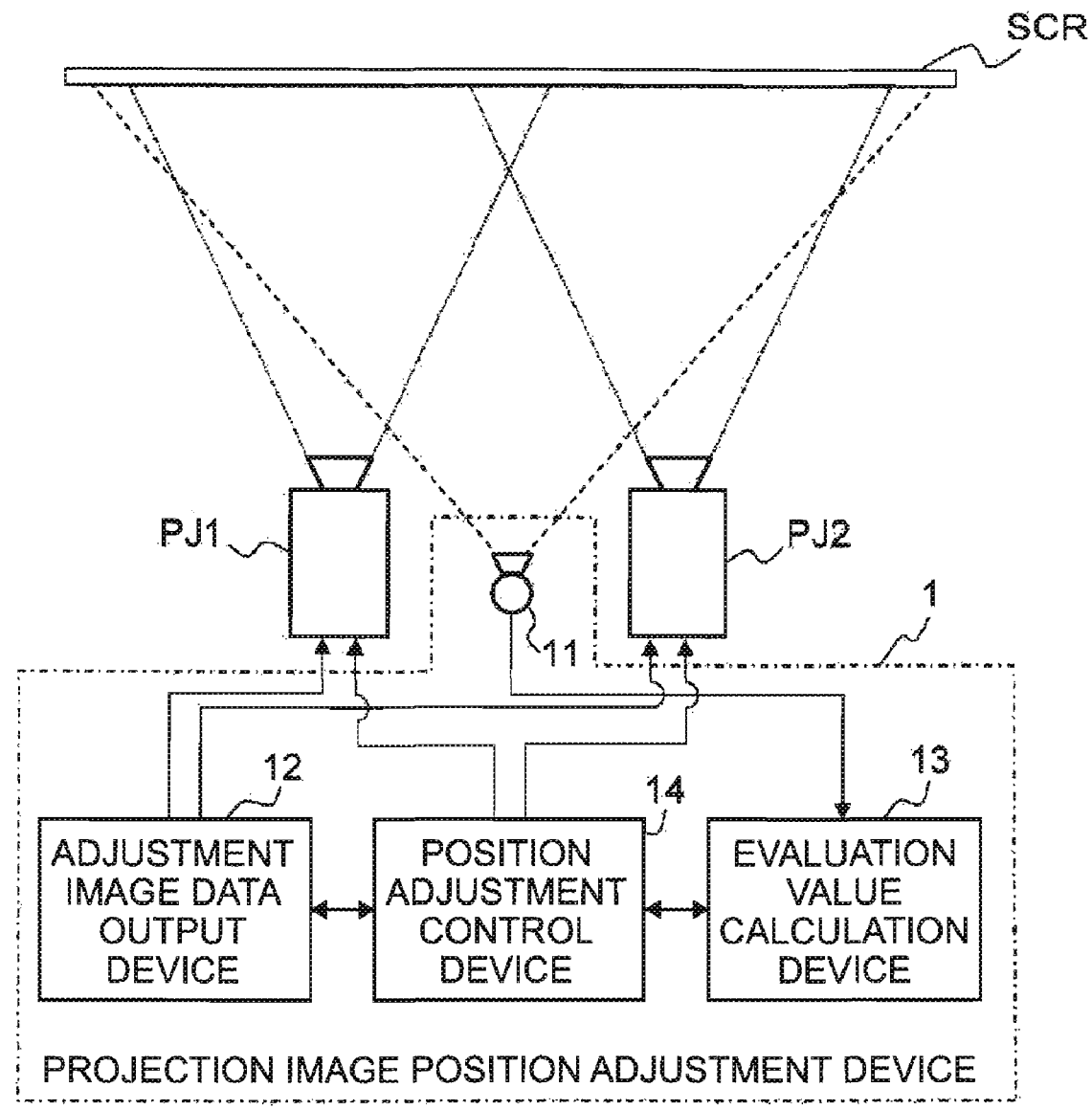
FIG. 1 is a diagram showing the configuration of a multi-projection display to which a projection image position adjustment method of a first embodiment is applied.

FIG. 1 is a diagram showing the configuration of a multi-projection display to which a projection image position adjustment method of a first embodiment is applied. For the sake of clarity, the multi-projection display of FIG. 1 is provided with two horizontally-disposed right and left projectors PJ1 and PJ2. The projectors PJ1 and PJ2 are so placed that their projection images are partially overlaid to form an overlay area for tile projection on a screen SCR serving as a projection screen. Note that FIG. 1 is a bird's eye view of the screen SCR and the projectors PJ1 and PJ2.

The multi-projection display of FIG. 1 is configured to include the two projectors PJ1 and PJ2, and a projection image position adjustment device 1 capable of applying position adjustment to projection images coming from the two projectors PJ1 and PJ2.

In response to an external operation, the projectors PJ1 and PJ2 are each so configured that the display position of a projection image can be internally moved on a pixel-by-pixel basis on the screen SCR in the horizontal and vertical directions. Considered here is an exemplary case where the display position of a displaying image cannot be moved by an external operation. With this being the case, alternatively, the image may be moved on a pixel-by-pixel basis in the horizontal and vertical directions in an image data output device, e.g., personal computer, before the image is provided to the projectors PJ1 and PJ2.

The projection image position adjustment device 1 is configured to include an image pickup device 11, an adjustment image data output device 12, an evaluation value calculation device 13, and a position adjustment control device 14. The image capture device 11 is capable of capturing the adjustment images CG1 and CG2 that are tile-projected on the screen SCR with an overlay area partially therebetween. The adjustment image data output device 12 can output, to the projectors PJ1 and PJ2, adjustment image data CGD1 and CGD2 corresponding to the two adjustment images CG1 and CG2, respectively. The evaluation value calculation device 13 calculates an evaluation value for an adjustment image based on the image capture data provided by the image capture device 11. Based on the evaluation result derived by the evaluation value calculation device 13, the position adjustment control device 14 acquires the optimum projection positions for the projection images from the projectors PJ1 and PJ2, and subjects the projection images to position adjustment based on the acquired positions.

In the projection image position adjustment method of the first embodiment, either the adjustment image CG1 or CG2 is fixed, and the remaining adjustment image is moved in vertical direction, i.e., up-and-down direction, on the screen SCR so that the optimum projection position is detected. Herein, the to-be-fixed image is exemplified as being the adjustment image CG1 projected by the projector PJ1, and the to-be-moved image is exemplified as being the adjustment mage CG2 projected by the projector PJ2.

Figure 2:
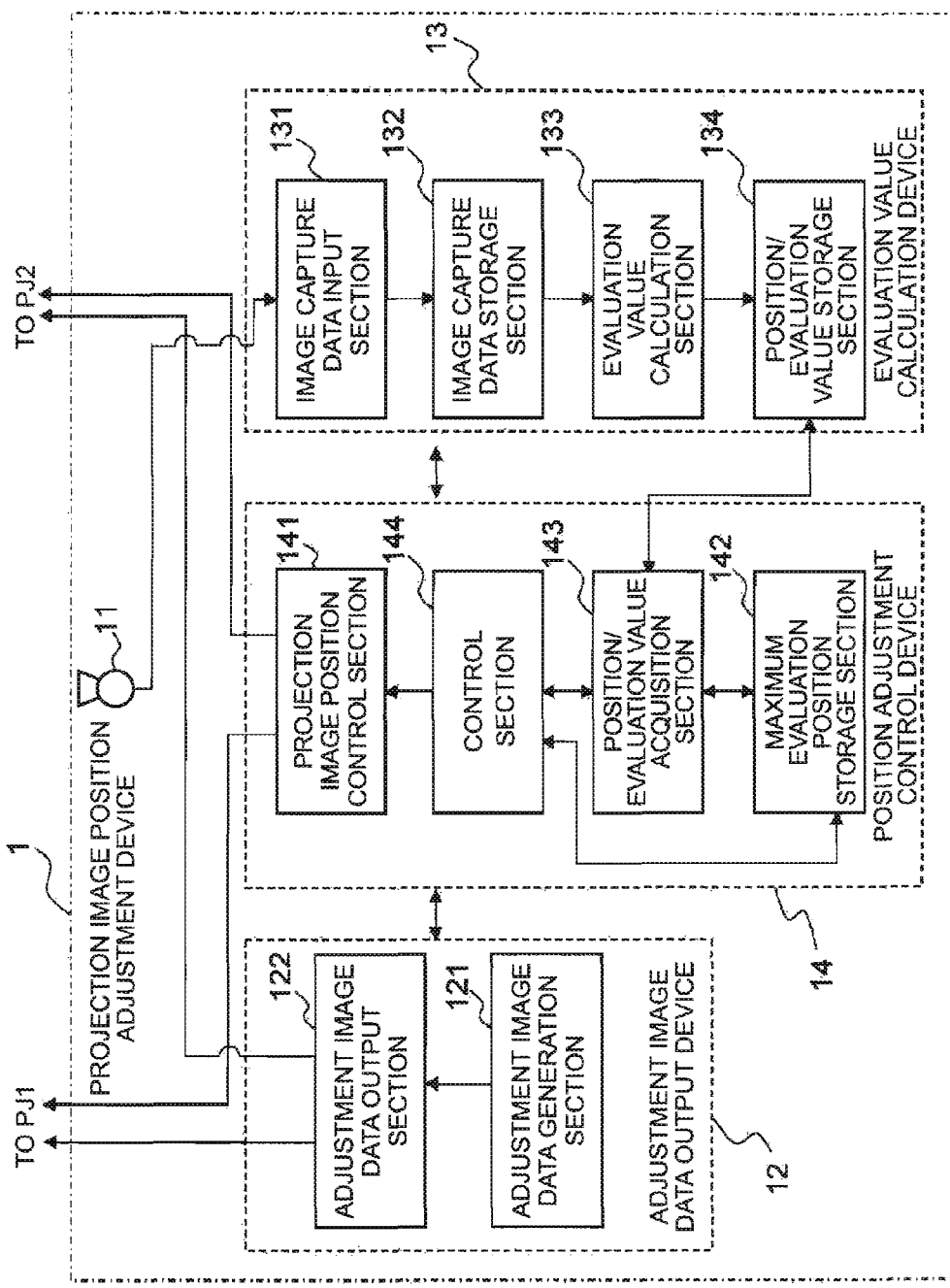
FIG. 2 is a diagram showing in detail the configuration of a projection image position adjustment device 1.

FIG. 2 is a diagram showing in detail the configuration of the projection image position adjustment device 1. The adjustment image data output device 12 is configured to include an adjustment image data generation section 121, and an adjustment image data output section 122. The adjustment image data generation section 121 generates the adjustment image data CGD1 and CGD2 for the projectors PJ1 and PJ2, respectively. The adjustment image data output sect on 122 outputs thus generated adjustment image data CGD1 and CGD2 to each corresponding projector PJ1 or PJ2.

The image capture device 11 captures the adjustment images CG1 and CG2 projected by the projectors PJ1 and PJ2 on the screen SCR, and outputs the resulting image capture data. The adjustment images CG1 and CG2 are those corresponding to the adjustment image data CGD1 and CGD2, respectively. Herein, the image capture device 11 may be of a resolution lower than that of the projection images projected on the screen SCR.

The evaluation value calculation device 13 is configured to include an image capture data input section 131, an image capture data storage on 132, an evaluation value calculation section 133, and a position/evaluation value storage section 134. The image capture data input section 131 receives, for input, the image capture data derived by the image capture device 11 capturing the adjustment images CG1 and CG2 on the screen SCR. The image capture data storage section 132 stores the input image capture data. The evaluation value calculation section 133 calculates an evaluation value based on the positional relationship between the adjustment images CG1 and CG2. The details of the evaluation value will be described later. The position/evaluation value storage section 134 correlates, for storage, the position of the adjustment image CG2 after the position movement and the calculated evaluation value.

The position adjustment control device 14 is configured to include a projection image position control section 141, a maximum evaluation position storage section 142, a position/evaluation value acquisition section 143, and a control section 144. The projection image position control section 141 is capable or exercising control, on a pixel-by-pixel basis, over the position movement of the projection images from the projectors PJ1 and PJ2. The position/evaluation value acquisition section 143 receives, for input, the positions stored in the position/evaluation value storage section 134 in the evaluation value calculation device 13, and the evaluation values for the positions. Among the evaluation values, the position/evaluation value acquisition section 143 then acquires the maximum evaluation value and the position thereof (hereinafter, such a position is referred to as maximum evaluation position), and stores the maximum evaluation position for the acquired maximum evaluation value into the maximum evaluation position storage section 142. The control section 144 forwards movement control information to the projection image position control section 141 based on the maximum evaluation value and the maximum evaluation position thereof acquired in the position/evaluation value acquisition section 143.

FIGS. 3A and 3B are schematic diagrams showing, respectively, exemplary adjustment images CG1 and CG2 projected on the screen SCR from the two projectors PJ1 and PJ2 disposed horizontally in a row. More specifically, FIG. 3A shows the adjustment image CG1, and FIG. 3B shows the adjustment image CG2. The adjustment images CG1 and CG1 are both used for position adjustment in the vertical direction on the screen SCR to be applied to the projection images from the projectors PJ1 and PJ2.

As described in the foregoing, as to the adjustment images CG1 and CG2, adjustment images are to be so generated as to correspond to the two projectors PJ1 and PJ2, and the resulting two adjustment images may be provided to each corresponding projector PJ1 or PJ2. Alternatively, an adjustment image may be generated, and the resulting adjustment image may be divided for provision to each corresponding projector PJ1 or PJ2. This is also applicable to adjustment images for use in the projection image position adjustment methods in the following embodiments.

When projected on the screen SCR with an appropriate positional relationship, the adjustment images CG1 and CG2 are each having such a pattern that the predetermined characteristics appear in their overlay area.

That is, in the two adjustment images CG1 and CG2, the adjustment image CG1 has a first pattern of a first color, and the other adjustment image CG2 has a second pattern of a second color. The first and second colors are each set with values for a red component, a green component, and a blue component in the two adjustment images to derive the color of white when the first and second patterns are overlaid on each other.

For example, the first color of the adjustment image CG1 may have a relatively-high-intensity red component, and a relatively-low-intensity green component. The second color of the adjustment image CG2 may have a relatively-high-intensity blue component, and a relatively-low-intensity green component. Specifically, the first color of the adjustment image CG1 is so set as to include pixel values (tone values) of R=255, G=160, and B=0 for the components of R (red), G (green), and B (blue). The second color of the adjustment image CG2 is so set as to include pixel values (tone values) of R=0, G=160, and B=255 for the components of R (red), G (green), and B (blue). Herein, the background is preferably in black, and the pixel values for use in the embodiments of the invention are representing the brightness values.

To have the pixel value of white (R=255, G=255, and B=255) in an overlay area of the adjustment images CG1 and CG2, ideally, the G (green) component of the adjustment images CG1 and CG2 is 128. Actually, however, the image capture data may show a change of brightness characteristics as is affected by the gamma characteristics or lighting condition of the projectors PJ1 and PJ2, or image capture devices. In consideration thereof, in the first embodiment, a setting is made to G (green)=160. As such, the value of G (green) can be set to any value considered appropriate for the condition.

Exemplified in the above is the case where the pixel values of R and B are fixedly set to either 255 or 0 so as to optimally change the value of G. Alternatively, the pixel values of C and B may be fixedly set to either 255 or 0 so as to optimally change the value of R, or the pixel values of R and G may be fixedly set to 255 or 0 so as to optimally change the value of B. Note that it is preferable to optimally set the value of G (green) because the image capture device is generally sensitive to G (green).

The adjustment images CG1 and CG2 each have a pattern, i.e., first or second pattern, of a line drawing including a plurality of linear lines in the horizontal direction. As shown in the enlarged view of FIG. 3A indicated by the dashed lines, the line width (thickness) corresponds to a pixel of an electrooptic modulator (liquid crystal modulator) provided to each of the projectors PJ1 and PJ2, and the line interval corresponds to 20 pixels of the liquid crystal modulator in the projectors PJ1 and PJ2.

Described next is the projection image position adjustment method of the first embodiment. Assumed here is that, in the projectors PJ1 and PJ2, the liquid crystal modulator has the resolution of 1280 pixels wide by 720 pixels high, and the image capture device has the resolution of 1280 pixels wide by 1024 pixels high.

First of all, a user manually adjusts the positions of the two adjustment images CG1 and CG2 in a possible range. Herein, the positions set as a result of such user's manual position adjustment are referred to as initial positions.

The adjustment images CG1 and CG2 are then subjected to eventual fine adjustment from the initial positions utilizing the projection image position adjustment method of the first embodiment so that their optimum projection positions are determined. Described below is the procedure of projection image position adjustment in the projection image position adjustment method of the first embodiment of the invention.

The adjustment image data output device 12 first forwards the adjustment image data CGD1 to the projector PJ1 which is in charge of image projection for the left-side portion of the screen SCR. The adjustment image data output device 12 also forwards the adjustment image data CGD2 to the projector PJ2 which is in charge of image projection for the right-side portion of the screen SCR. As to these adjustment image data CGD1 and CGD2, the adjustment image data CGD1 has the pixel values of R=255, G=160, and B=0, and the adjustment image data CGD2 has the pixel values of R=0, G=160, and B=255.

FIG. 4 is a schematic diagram showing the state in which the adjustment images CG1 and CG2 of FIGS. 3A and 3B are projected on the screen SCR with an overlay area partially therebetween. As shown in FIG. 4, the screen SCR displays thereon the adjustment image CG1 having the pixel values of R=255, G=160, and B=0, which is projected by the projector PJ1, and the adjustment image CG2 having the pixel values of R=0, G=160, and B=255, which is projected by the projector PJ2. The adjustment images CG1 and CG2 are overlaid together so that there is an overlay area therebetween. The adjustment images CG1 and CG2 of FIG. 4 are assumed as being not yet subjected to position adjustment.

After the adjustment images CG1 and CG2 are projected on the screen SCR, either the adjustment image CG1 or CG2 is moved in the vertical direction on a pixel-by-pixel basis. As described above, in the first embodiment, the adjustment image CG1 is fixed, and the adjustment image CG2 is moved in position on a pixel-by-pixel basis. Herein, moving the adjustment image CG2 on a pixel-by-pixel basis is easily done by using the function provided to the liquid crystal modulator in the projector PJ2 to move, on a pixel-by-pixel basis, the position of the effective image display area in the image formation area.

The adjustment image CG2 from the projector PJ2 is moved in the vertical direction, i.e., up direction, for 10 pixels from the initial position set as a result of manual position adjustment. The resulting position is hereinafter referred to as process start position. The adjustment image CG2 is then sequentially moved in the down direction for 20 pixels from the process start position.

The reason of the above-described operation, i.e., the adjustment image CG2 projected by the projector PJ2 is moved from the manually-set initial position in the vertical direction for 10 pixels, and then the image is moved from the resulting process start position for 20 pixel, is that the manually-set initial position is correct to some extent even if the operation is manually done. The probability is thus high that the optimum projection position is located in the range of about 10 pixels in the vertical direction relative to the initial position. Such an operation can lead to the optimum projection position with more efficiency.

Figure 5:
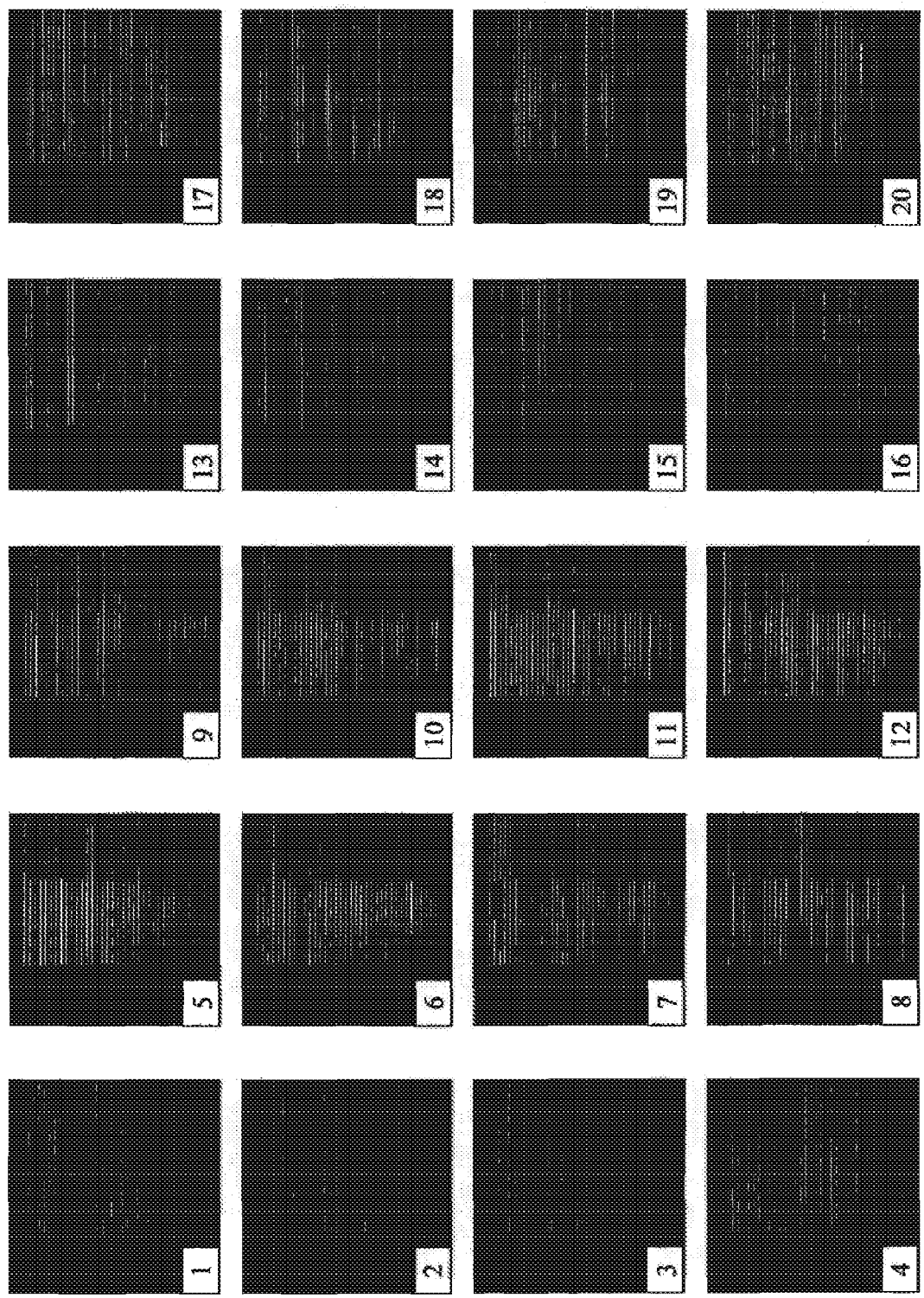
FIG. 5 shows enlarged overlay areas between the adjustment images CG1 and CG2 viewed at specific positions of the adjustment image CG2 in image capture data provided by an image capture device 11.

FIG. 5 shows enlarged overlay areas between the adjustment images CG1 and CG2 viewed at specific positions of the adjustment image CG2 in image capture data provided by the image capture device 11. The images of FIG. 5 are the adjustment images CG1 and CG2 at specific positions after the adjustment image CG2 is sequentially moved, on a pixel-by-pixel basis, in the down direction from the process start position for 20 pixels. In FIG. 5, the numbers of "1" to "20" at the lower left portion of the images indicate the positions of the adjustment image CG2 in the course of being moved for 20 pixels from the process start position, and the position "1" is the process start position.

As the adjustment image CG2 is moved on a pixel-by-pixel basis, the image capture device 11 captures the adjustment images CG1 and CG2 on the screen SCR, and outputs the resulting image capture data. This image capture data is entered into the image capture data input section 131, and then stored in the image capture data storage section 132. Using the image capture data stored in the image capture data storage section 132, the evaluation value calculation section 133 calculates an evaluation value every time the adjustment image CG2 is moved for a pixel. The evaluation value is calculated as below.

As shown in FIG. 5, when the adjustment images CG1 and CG2 establish a predetermined positional relationship after the adjustment image CG2 is moved on a pixel-by-pixel basis, the overlay area therebetween shows characteristics that are not observed in the original adjustment images CG1 and CG2. Here, the characteristics of appearing in the overlay area between the adjustment images CG1 and CG2 are the pixel value change observed in the image capture data as a result of line overlay between the adjustment images CG1 and CG2. With this being the case, when these adjustment images are appropriately overlaid on each other, the color of white emerges in their overlay area.

Here, because the images of FIG. 5 are monochrome, it is difficult to notice the appearance of white from FIG. 5. In real world, the images of FIG. 5 are in color so that the appearance of white is easily noticed. With this being the case, in the overlay area between the adjustment images CG1 and CG2, the color of white including pixel values reaching a predetermined threshold value may be indicated by pink, and reading of appearance of white is eased to a further extent on the colored images on the display. The details of the threshold value will be left for later description.

Figure 6:
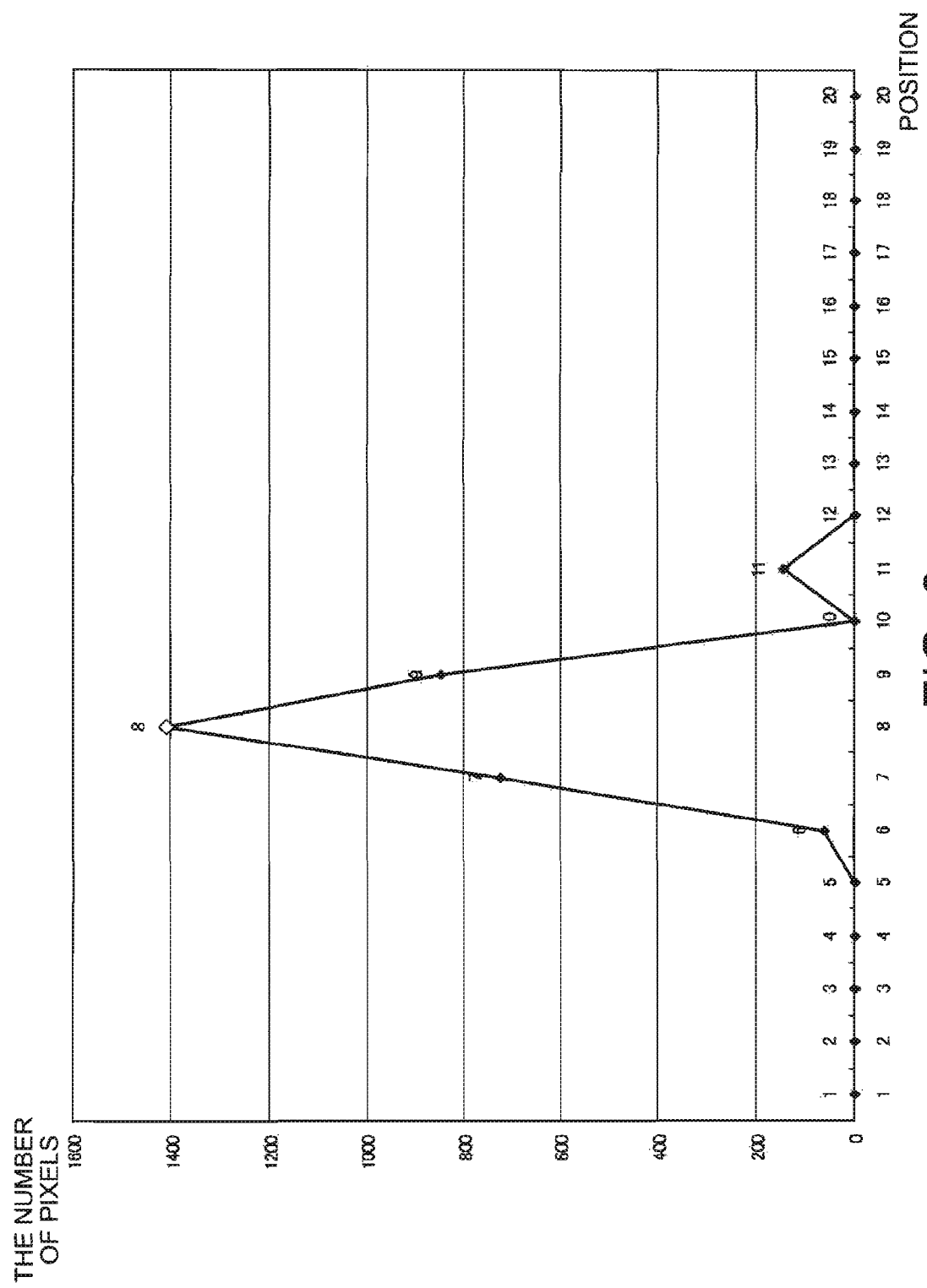
FIG. 6 is a diagram showing the number of pixels determined as showing a color of white in a range from a process start position "1" to a 20-pixel-away position "20".

Although the reading is not easy from FIG. 5, FIG. 6 tells that the area of white starts appearing from the position "6", and the area of white is maximized at the position "8". Thereafter, as the image is moved to the positions "9", "10", and onwards, the area of white abruptly starts decreasing in size.

In FIG. 5, the adjustment images CG1 and CG2 are determined as being in the appropriate positional relationship at the position "8". For such a determination whether or not the adjustment images CG1 and CG2 are in the appropriate positional relationship, used is the number of pixel showing the color of white in the image capture data.

To see whether the color of white appears or not, the pixel values are referred to whether the values are reaching a predetermined value or more. That is, ideally, the color of white is determined as appearing when the pixel values show R, G, B=(255, 255, 255). In the embodiments of the invention, the pixel value serving as a threshold value is set to R, G, B=(240, 240, 240), for example, and any pixel value being equal to or larger than R, G, B=(240, 240, 240) is determined as showing the color of white.

The reason of the threshold value being not R, G, B=(255, 255, 255) but R, G, B=(240, 240, 240) is the concern for the fluctuations possibly caused by the equipment characteristics such as gamma characteristics or lighting condition, and thus a fixed margin is provided.

FIG. 6 is a diagram showing the number of pixels in a range from a process start position "1" to a 20-pixel-away position "20" at which the color is determined as white. As shown in FIG. 6, the number of pixels determined as showing the color of white is the largest at the position "8". Herein, the number of pixels for the respective positions of FIG. 6 is calculated by the evaluation value calculation section 133 of FIG. 2. The resulting number of pixel values is correlated to each corresponding position, and then stored into the position/evaluation value storage section 134 of the evaluation value calculation device 13 of FIG. 2.

From the storage contents of the position/evaluation value storage section 134 of the evaluation value calculation device 13, the position/evaluation value acquisition section 143 of the position adjustment control device 14 of FIG. 2 acquires the position with the largest number of pixels as the maximum evaluation position. Thus acquired maximum evaluation position is then stored into the maximum evaluation position storage section 142. In this example, because the position "8" is the maximum evaluation position with the largest number of pixels, the position "8" is stored into the maximum evaluation position storage section 142 as the maximum evaluation position.

That is, when the adjustment image CG2 is at the position "8", FIG. 6 shows that the lines of the adjustment images CG1 are overlaid with the lines of the adjustment image CG2 in the vertical direction with the optimum positional relationship. If the projectors PJ1 and PJ2 perform image projection in the positional relationship, it means that the projection images are to be projected at the projection positions considered optimum in the vertical direction.

The position adjustment is thus made in such a manner that the projection image from the projector PJ2 comes to the maximum evaluation position for its projection position. This accordingly brings the projection images from the projectors PJ1 and PJ2 to the optimum projection positions, which are appropriately subjected to position adjustment in the vertical direction. Therefore, the resulting image can be of high quality, with no irregular seam in the overlay area or no image blurring.

In the projection image position adjustment method of the first embodiment, the resolution of the image capture device 11 in use is of 1280 pixels wide by 1024 pixels high. Even with the relatively low resolution of about a million pixels, the device is capable of applying position adjustment to higher-resolution projection images on a pixel-by-pixel basis. In this example, the resolution of a projector is of 1280 pixels wide by 720 pixels high.

Figure 7:
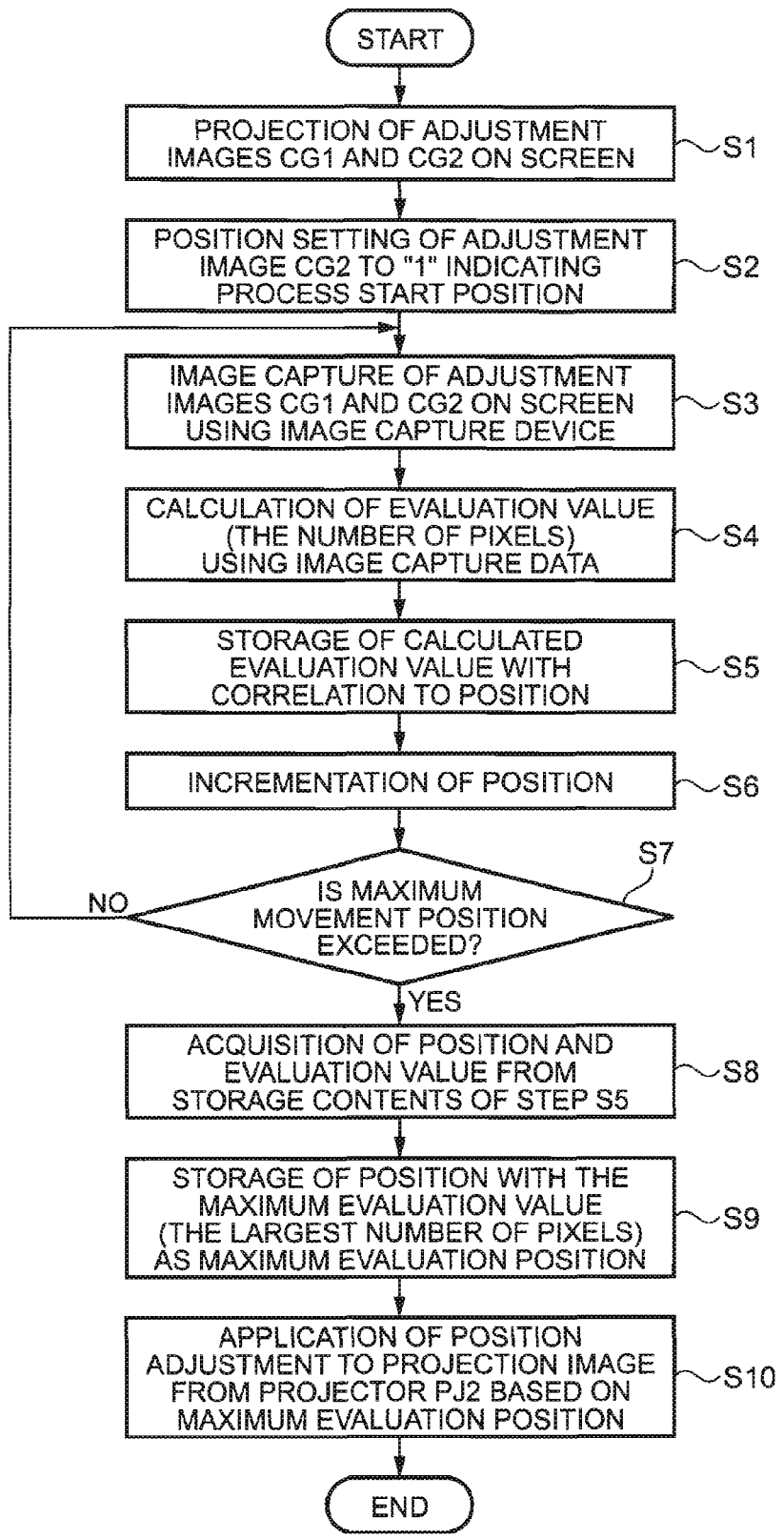
FIG. 7 is a schematic flowchart showing a projection image position control procedure in the projection image position adjustment method of the first embodiment.

FIG. 7 is a schematic flowchart showing a projection image position control procedure in the projection image position adjustment method of the first embodiment. Because the process steps of FIG. 7 are already described, only the comprehensive process flow is described here briefly.

First of all, the projectors PJ1 and PJ2 project the adjustment images CG1 and CG2 onto the screen SCR (step S1). A user then manually adjusts, in a possible range, the positions of the adjustment images CG1 and CG1 projected by the projectors PJ1 and PJ2, and the position of either the adjustment image CG1 or CG2 (in this example, the adjustment image CG2) is set to the process start position "1" (step S2). In this state, the image capture device 11 captures the adjustment images CG1 and CG2 on the screen SCR (step S3).

Using image capture data derived as a result of such image capture, an evaluation value (the number of pixels) is calculated (step S4), and thus calculated evaluation value is stored with a correlation with the position (step S5).

The position is then incremented (step S6), and a determination is made whether the incremented position is exceeding the maximum movement position, i.e., "20" in the first embodiment (step S7). If the position is not exceeding the maximum movement position, the procedure returns to step S3 for the processes thereafter. If the position is exceeding the maximum movement positions, the positions and evaluation values are acquired from the storage contents of FIG. 5 (step S8). Among the acquisition result, the position having the maximum evaluation value (the number of pixels) is stored into the maximum evaluation position storage section 142 as the maximum evaluation position (step S9).

The control section 144 then adjusts the position of the projector PJ2 in such a manner that the projector PJ2 projects images at the maximum evaluation position. This accordingly achieves the optimum positional relationship between projection images from the projectors PJ1 and PJ2 in the vertical direction.

In the above-described projection image position adjustment method of the first embodiment, as to the adjustment images CG1 and CG2 the adjustment image CG1 is fixed and the adjustment image CG2 is moved so that the adjustment image CG2 is defined by position. In an alternative manner, surely, the adjustment image CG2 may be fixed and the adjustment image CG1 may be moved for the purpose.

In the above embodiment, the optimum projection position is set by moving the position-adjusting adjustment image (the adjustment image CG2 in the first embodiment) for 20 pixels from the process start position. Alternatively, as will be described in the following modified example of the first embodiment, the optimum projection position may be set by moving the adjustment image CG2 for the arbitrary number of pixels from the process start position.

Modified Example of First Embodiment

Figure 8:
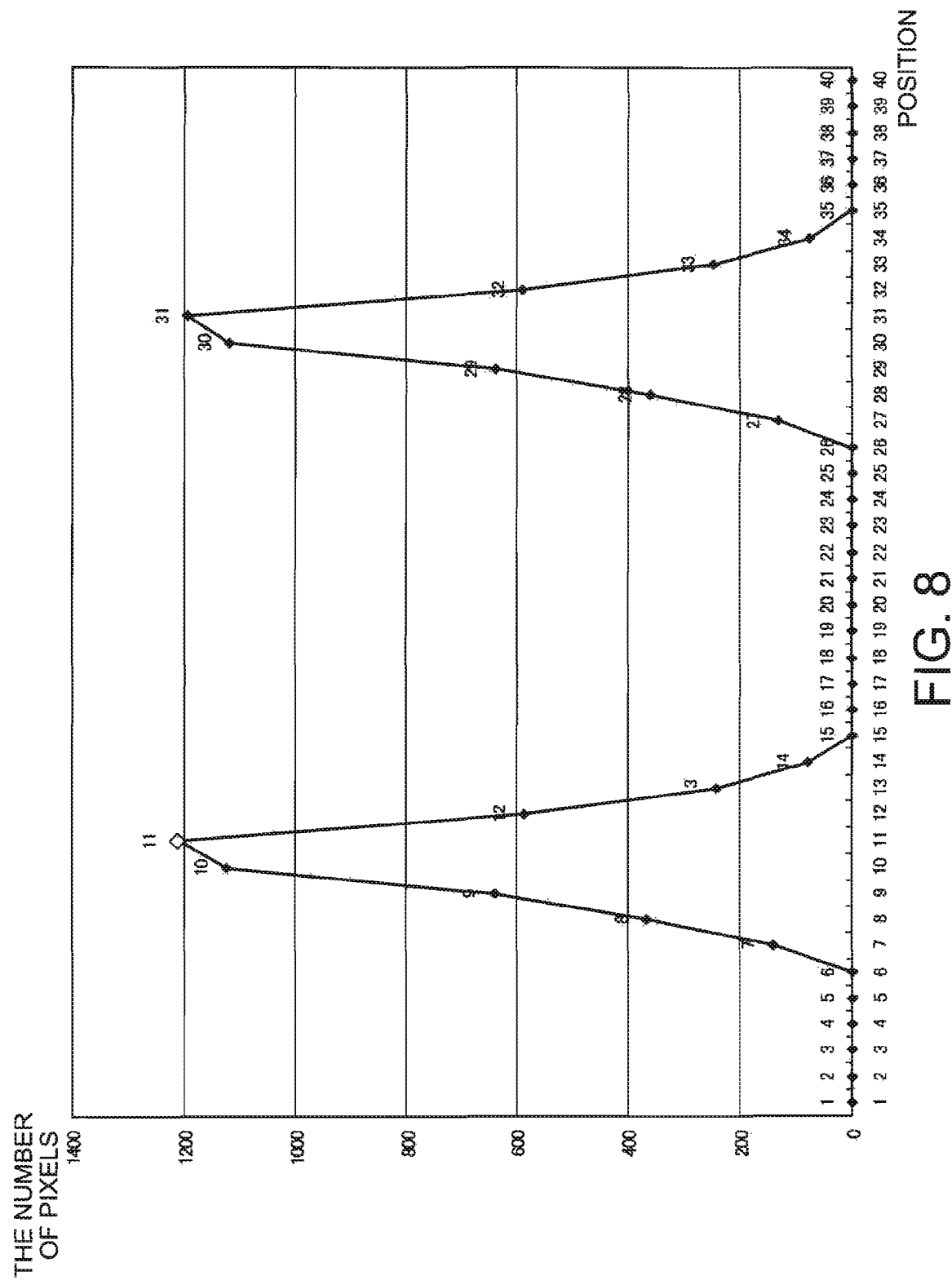
FIG. 8 is a diagram showing the number of pixels determined as showing a color of white in a range from the process start position "1" to a 40-pixel-away position "40".

FIG. 8 is a diagram showing the number of pixels in a range from a process start position "1" to a 40-pixel-away position "40" at which the color is determined as white. Also in this case, an initial position is set by the user manually adjusting, in a possible range, the positions of the two adjustment images CG1 and CG1. The position 20 pixels above the initial position is regarded as a process start position, and using the process start position, an optimum projection position is then searched.

As shown in FIG. 8, when the adjustment image CG2 is moved from the process start position "1" for 40 pixels, the line overlay between the adjustment images CG1 and CG2 is observed at least twice so that the number of pixels determined as showing the color of white reaches a peak twice. In FIG. 8 example, the number of pixels determined as showing the color of white reaches a peak at the position "11", and also at the position "31" being away from the position "11" with 20 pixels therebetween.

When the number of pixels reaches a peak for a plurality of times as such, basically, the position whose evaluation value (the number of pixels) is the largest is regarded as a maximum evaluation position. When the evaluation values are the same for the peaks, the following technique is applied to detect the optimum projection position, for example. An exemplary case is described by referring to FIG. 8.

In FIG. 8, assuming that the initial position is the position "10", a first peak is observed at the position "11", and a second peak is observed at the position "31". Therefore, the position "11" closer to the initial position is set as the optimum position.

As such, when the evaluation values are the same for a plurality of peaks, the peak closer to the initial position may be used as the optimum position. This is because, as described above, the manually-set initial position is correct to some extent even if the operation is manually done, and it is thus considered appropriate to regard the position closer to the initial position as the optimum projection position.

Second Embodiment

In the projection image position adjustment method of the first embodiment, described is the case where the protection images from the horizontally-disposed two projectors PJ1 and PJ2 are subjected to position adjustment in the vertical direction, i.e., up-and-down direction. In a projection image position adjustment method of a second embodiment, described is a case where the projection images from the horizontally-disposed two projectors PJ1 and PJ2 are subjected to position adjustment in the horizontal direction, i.e. right-and-left direction.

FIGS. 9A and 9B are schematic diagrams showing, respectively, exemplary adjustment images CG3 and CG4 projected on the screen SCR from the two projectors PJ1 and PJ2 disposed horizontally in a row. The adjustment images for use in such a case are the adjustment images CG3 and CG4 of FIGS. 9A and 9B.

The adjustment image data CGD3 and CGD4 corresponding to the adjustment images CG3 and CG4, respectively, are generated by the adjustment image data generation section 121 of FIG. 2. The adjustment image data CGD3 and CGD4 thus generated by the adjustment image data generation section 121 are forwarded to the projectors PJ1 and PJ2 by the adjustment image data output section 122 so that the screen SCR displays thereon the adjustment images CG3 and CG4 as shown in FIGS. 9A and 9B.

Similarly to the above-described adjustment images CG1 and CG2, also the adjustment images CG3 and CG4 each have a pattern showing the predetermined characteristics in their overlay area when projected on the screen SCR with any appropriate positional relationship. The adjustment images CG3 and CG4 are each assumed to have a pattern of a line drawing in the vertical direction. Herein, the thickness (width) of the line drawings, the interval between the line drawings, or others are the same as those for the adjustment images CG1 and CG2 (refer to the enlarged portion of FIG. 9A indicated by dashed lines).

FIG. 10 is a schematic diagram showing the state in which the adjustment images CG3 and CG4 of FIGS. 9A and 9B are projected on the screen SCR with an overlay area partially therebetween. As shown in FIG. 10, the screen SCR displays thereon the adjustment image CG3 having pixel values of R=255, G=160, and B=0, which is projected by the projector PJ1, and the adjustment image CG4 having pixel values of R=0, G=160, and B=255, which is projected by the projector PJ2, with an overlay area partially therebetween. The adjustment images CG3 and CG4 of FIG. 10 are assumed as being not yet subjected to position adjustment.

Also in the projection image position adjustment method of the second embodiment, either the adjustment image CG3 or CG4 is fixed, and the remaining adjustment image is moved in the horizontal direction, i.e., right-and-left direction, on the screen SCR so that the optimum projection position is detected. Herein, the to-be-fixed image is exemplified as being the adjustment image CG3 projected by the projector PJ1, and the to-be-moved image is exemplified as being the adjustment image CG4 projected by the projector PJ2. Herein, moving the adjustment image CG4 on a pixel-by-pixel basis is easily done by using the function provided to the liquid crystal modulator in the projector PJ2 to move, or, a pixel-by-pixel basis, the position of the effective image display area in the image formation area.

Using the projection image position adjustment device 1 of FIG. 2, the projection image position adjustment method of the second embodiment is executed almost in the same procedure as the projection image position adjustment method of the first embodiment. The description thereabouts is thus simply made herein.

First of all, a user manually adjusts, in a possible range, the positions of the adjustment images CG3 and CG4 projected by the projectors PJ1 and PJ2, and the position of the adjustment image CG4 projected by the projector PJ2 is moved in the horizontal direction, i.e., left direction, for 10 pixels. The resulting position is the process start position, and therefrom, the projector PJ2 is sequentially moved, on a pixel-by-pixel basis, in the right direction for 20 pixels.

The image capture device 11 then captures the adjustment images CG3 and CG4 on the screen SCR, and outputs the resulting image capture data. This image capture data is entered into the image capture data input section 131 of FIG. 2, and stored in the image capture data storage section 132. Using the image capture data stored in the image capture data storage section 132, the evaluation value calculation section 133 then calculates an evaluation value every time the adjustment image CG4 is moved on a pixel-by-pixel basis. The evaluation value is calculated in a similar manner to the first embodiment.

Figure 11:
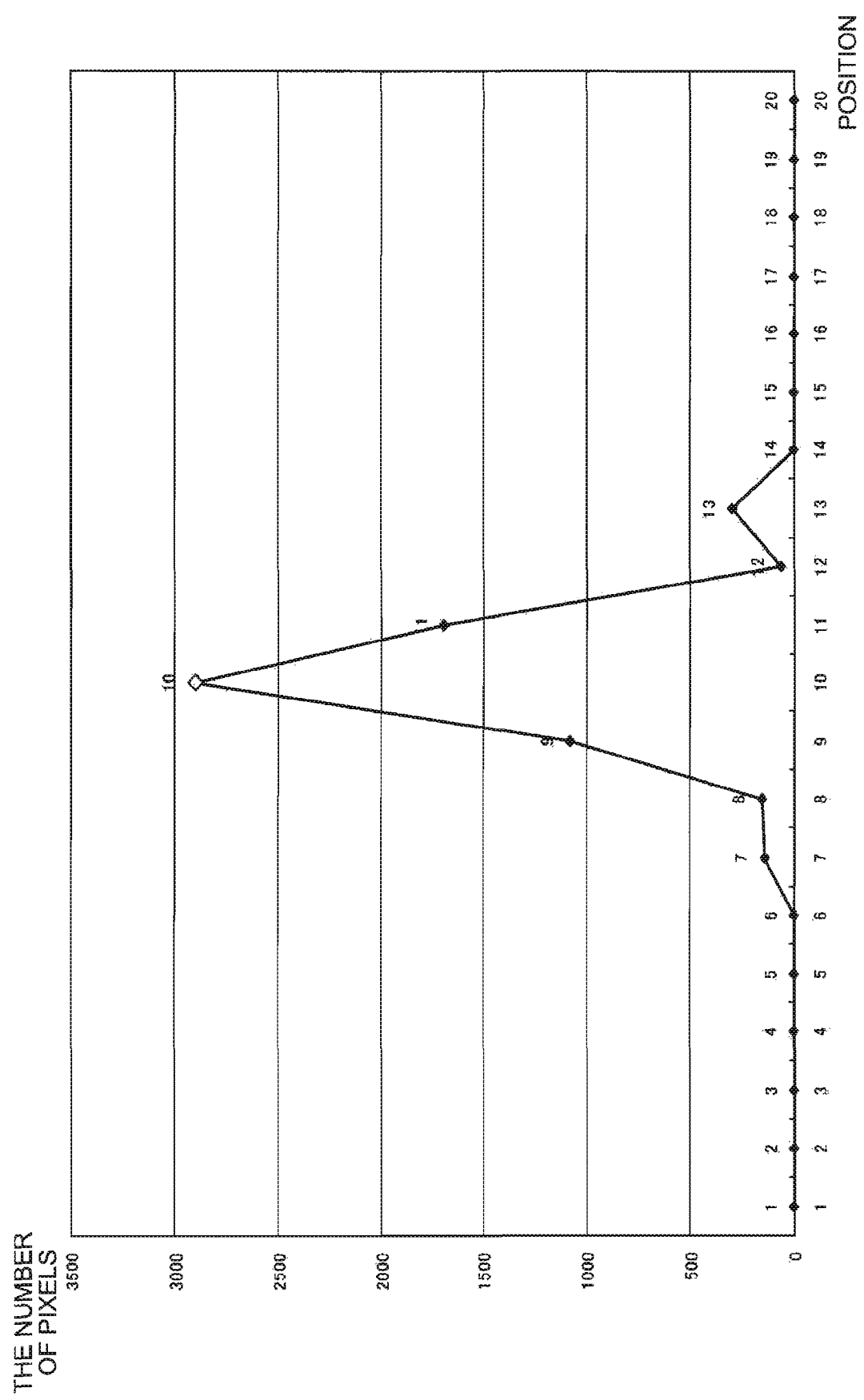
FIG. 11 is a diagram showing, in the adjustment images CG3 and CG4 of FIG. 10, the number of pixels determined as showing a color of white in a range from the process start position "1" to a 20-pixel-away position "20".

FIG. 11 is a diagram showing the number of pixels of the adjustment images CG3 and CG4 of FIG. 10 in a range from a process start position "1" to a 20-pixel-away position "20" at which the color is determined as white. Note that in FIG. 11 example, the position "10" is assumed to have the largest number of pixels determined as showing white. That is, such FIG. 11 example shows a case where the result of the user manually adjusting, in a possible range, the positions of the adjustment images CG3 and CG4 projected by the projectors PJ1 and PJ2 is determined as the optimum projection positions.

Note that, the procedure of projection image position adjustment in the projection image position adjustment method of the second embodiment can follow the flowchart of FIG. 7 referred to for describing the projection image position adjustment method of the first embodiment by replacing the adjustment images CG1 and CG2 with the adjustment images CG3 and CG4.

In the above-described projection image position adjustment method of the second embodiment, as to the adjustment images CG3 and CG4, the adjustment image CG3 is fixed and the adjustment image CG4 is moved so that the adjustment image CG4 is defined by position. In a alternative manner, surely, the adjustment image CG4 may be fixed and the adjustment image CG3 may be moved for the purpose.

Similarly to the description in the first embodiment given by referring to FIG. 8, in the projection image position adjustment method of the second embodiment, the optimum projection position may be set by moving one of the adjustment images, e.g., the adjustment image CG4, for the arbitrary number of pixels from the process start position.

Third Embodiment

In the projection image position adjustment methods of the first and second embodiments, described are the cases where the projection images from the horizontally-disposed two projectors PJ1 and PJ2 are subjected to position adjustment in the vertical direction, i.e., up-and-down direction, and in the horizontal direction, i.e., right-and-left direction, respectively. Using the adjustment images CG3 and CG4 used in the second embodiment, the positions of the projection images from the vertically-disposed projectors PJ1 and PJ2 can be also adjusted in the horizontal direction.

In the below, described is such position adjustment in the horizontal direction applied to the projection images from the vertically-disposed projectors PJ1 and PJ2 using the adjustment images CG3 and CG4.

The multi-projection display applied with a projection image position adjustment method of a third embodiment is similar to that of FIG. 1 except only that the two projectors PJ1 and PJ2 of FIG. 1 are disposed vertically in a row. The configuration of such a multi-projection display applied with the projection image position adjustment method of the third embodiment is not thus shown.

Presumably, the projector PJ1 is in charge of image projection for the vertically upper side of the screen SCR, and the projector PJ2 is in charge of image projection for the vertically lower side of the screen SCR. The projection images projected by the projectors PJ1 and PJ2 are tile-projected on the screen in such a manner as to have an overlay area partially therebetween.

Figure 12A:
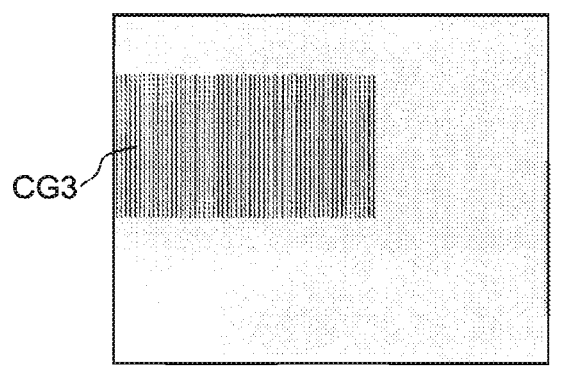
FIGS. 12A and 12B are schematic diagrams showing, respectively, exemplary adjustment images CG3 and CG4 projected on the screen SCR separately from the two projectors PJ1 and PJ2 disposed vertically in a row.
Figure 12B:
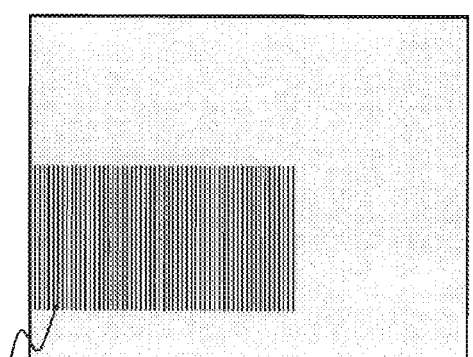

FIGS. 12A and 12B are schematic diagrams showing, respectively, exemplary adjustment images CG3 and CG4 projected on the screen SCR from the two projectors PJ1 and PJ2 disposed vertically in a row. More specifically, FIG. 12A shows the adjustment image CG3, and FIG. 12B shows the adjustment image CG4.

Figure 13:
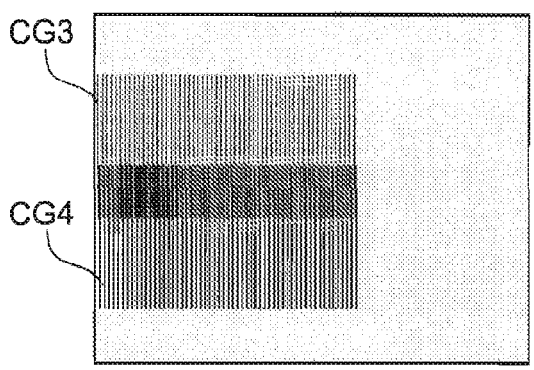
FIG. 13 is a schematic diagram showing the state in which the adjustment images CG3 and CG4 of FIGS. 12A and 12B are projected on the screen SCR with an overlay area partially therebetween.

FIG. 13 is a schematic diagram showing the state in which the adjustment images CG3 and CG4 of FIGS. 12A and 12B are projected on the screen SCR with an overlay area partially therebetween. As shown in FIG. 13, the screen SCR displays thereon the adjustment image CG3 having the pixel values of R=255, G=160, and B=0, which is projected by the projector PJ1, and the adjustment image CG4 having the pixel values of R=0, G=160, and B=255, which is projected by the projector PJ2, with an overlay area partially therebetween. The adjustment images CG3 and CG4 of FIG. 13 are assumed as being riot yet subjected to position adjustment.

Also in the projection image position adjustment method of the third embodiment, either the adjustment image CG3 or CG4 is fixed, and the remaining adjustment image is moved in the horizontal direction, i.e., right-and-left direction, on the screen SCR so that the optimum projection position is detected. Herein, the to-be-fixed image is exemplified as being the adjustment image CG3 projected by the projector PJ1, and the to-be-moved image is exemplified as being the adjustment image CG4 projected by the projector PJ2.

Using the projection image position adjustment device 1 of FIG. 2, the projection image position adjustment method of the third embodiment is executed almost in the same procedure as the projection image position adjustment method of the first embodiment. The description thereabout is thus simply made herein.

First of all, a user manually adjusts, in a possible range, the positions of the adjustment images CG3 and CG4 projected by the projectors PJ1 and PJ2, and the position of the adjustment image CG4 projected by the projector PJ2 is moved in the horizontal direction, i.e., left direction, for 10 pixels. The resulting position is the process start position, and therefrom, the adjustment image CG4 is sequentially moved, on a pixel-by-pixel basis, in the right direction for 20 pixels.

The image capture device 11 then captures the adjustment images CG3 and CG4 on the screen SCR, and outputs the resulting image capture data. This image capture data is entered into the image capture data input section 131 of FIG. 2, and stored in the image capture data storage section 132. The evaluation value calculation section 133 then calculates an evaluation value every time the adjustment image CG4 is moved on a pixel-by-pixel basis using the image capture data stored in the image capture data storage section 132. The evaluation value is calculated in a similar manner to the projection image position adjustment method of the first embodiment.

That is, at the respective positions after the adjustment image CG4 is moved on a pixel-by-pixel basis, the number of pixels determined as showing the color of white is acquired so that the position showing the largest number of pixels is set as the optimum projection position. As a result, the projection images from the projectors PJ1 and PJ2 are appropriately subjected to position adjustment in the horizontal direction so that the resulting image can be of high quality, with no irregular seam in the overlay area or no image blurring.

Note that, the procedure of projection image position adjustment in the projection image position adjustment method of the third embodiment can follow the flowchart of FIG. 7 referred to for describing the projection image position adjustment method of the first embodiment by replacing the adjustment images CG1 and CG2 with the adjustment images CG3 and CG4.

In three above-described projection image position adjustment method of the third embodiment, as to the adjustment images CG3 and CG4, the adjustment image CG3 is fixed and the adjustment image CG4 is moved so that the adjustment image CG4 is defined by position. In an alternative manner, surely, the adjustment image CG4 may be fixed and the adjustment image CG3 may be moved for the purpose.

Similarly to the description in the first embodiment given by referring to FIG. 8, in the projection image position adjustment method of the third embodiment, the optimum projection position may be set by moving one of the adjustment images, e.g., the adjustment image CG4, for the arbitrary number of pixels from the process start position.

Fourth Embodiment

In the projection image position adjustment method of the third embodiment, described is the case where the projection images from the vertically-disposed two projectors PJ1 and PJ2 are subjected to position adjustment in the horizontal direction, i.e., right-and-left direction. Using the adjustment images CG1 and CG2 used in the first embodiment, the positions of the projection images from the vertically-disposed projectors PJ1 and PJ2 can be adjusted also in the vertical direction, i.e., up-and-down direction.

Figure 14:
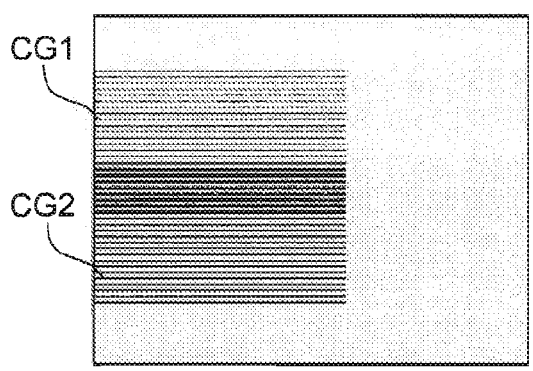
FIG. 14 is a schematic diagram showing the state in which the adjustment images CG1 and CG1 are projected on the screen SCR by the two projectors PJ1 and PJ2 disposed vertically in a row with an overlay area partially therebetween.

FIG. 14 is a schematic diagram showing the state in which the adjustment images CG1 and CG2 are projected by the vertically-disposed two projectors PJ1 and PJ2 on the screen SCR with a partial overlay area therebetween. The adjustment images CG1 and CG2 of FIG. 14 are assumed as being not yet subjected to position adjustment.

Also in the projection image position adjustment method of the fourth embodiment, either the adjustment image CG1 or CG2 is fixed, and the remaining adjustment image is moved in the vertical direction, i.e., up-and-down direction, on the screen SCR so that the optimum projection position is detected. Herein, the to-be-fixed image is exemplified as being the adjustment image CG1 projected by the projector PJ1, and the to-be-moved image is exemplified as being the adjustment image CG2 projected by the projector PJ2.

A user then manually adjusts, in a possible range, the positions of the adjustment images CG1 and CG2 projected by the projectors PJ1 and PJ2, and the position of the adjustment image CG2 projected by the projector PJ2 is moved in the vertical direction, i.e., up direction, for 10 pixels. The resulting position is the process start position, and therefrom, the adjustment image CG2 is sequentially moved, on a pixel-by-pixel basis, in the down direction for 20 pixels. Herein, the process of setting an optimum projection position, e.g., calculating an evaluation value, can be executed in a similar manner to the above so that no description is given here.

Note that, the procedure of projection image position adjustment in the projection image position adjustment method of the fourth embodiment can follow the flowchart of FIG. 7 referred to for describing the projection image position adjustment method of the first embodiment.

In the above-described projection image position adjustment method of the fourth embodiment, as to the adjustment images CG1 and CG2, the adjustment image CG1 is fixed and the adjustment image CG2 is moved so that the adjustment image CG2 is defined by position. In an alternative manner, surely, the adjustment image CG2 may be fixed and the adjustment image CG1 may be moved for the purpose.

Similarly to the description in the first embodiment given by referring to FIG. 8, in the projection image position adjustment method of the fourth embodiment, the optimum projection position may be set by moving one of the two adjustment images, e.g., the adjustment image CG2, for the arbitrary number of pixels from the process start position.

As described in the first to fourth embodiments, using the adjustment images CG1 and CG2 and the adjustment images CG3 and CG4 can favorably lead to the high-speed and highly-accurate positional adjustment, in both horizontal and vertical directions, of projection images projected by the two projectors PJ1 and PJ2 no matter which direction the two projectors are disposed, i.e., vertical or horizontal.

More in detail, for the projection images from the two projectors PJ1 and PJ2, using the adjustment images CG1 and CG2 can lead to the high-speed and highly-accurate position adjustment in the vertical direction, and using the adjustment images CG3 and CG4 can lead to the high-speed and highly-accurate position adjustment in the horizontal direction.

Moreover, through combination of the projection image position adjustment methods of the first to fourth embodiments as appropriate, in a multi-projection display including m×n projectors, i.e., m projectors in the horizontal direction and n projectors in the vertical direction, the projection image position adjustment can be performed at high speed with high accuracy.

Figure 15:
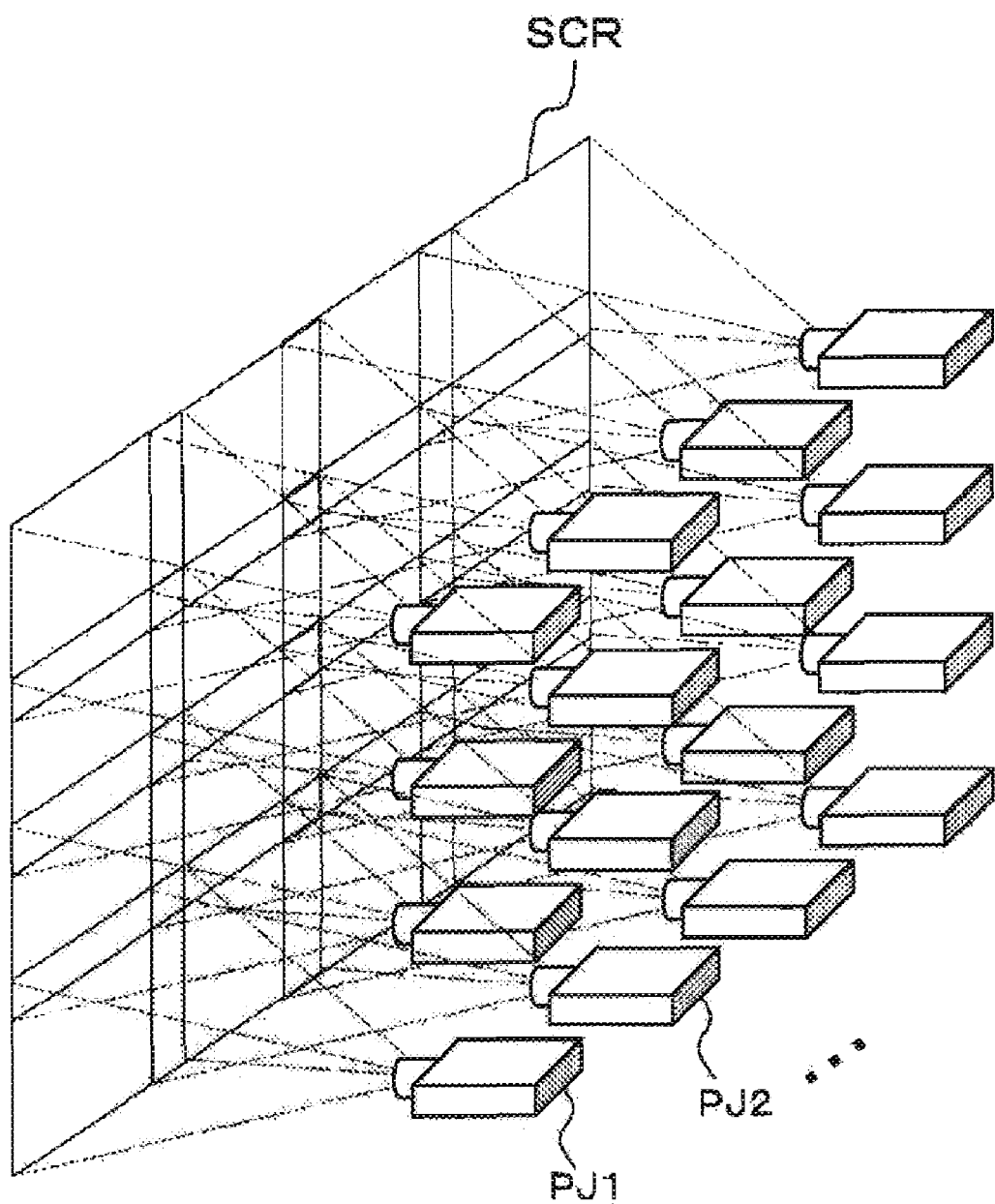
FIG. 15 is a diagram showing a multi-projection display including 16 projectors of 4×4.

FIG. 15 shows an exemplary multi-projection display including 4×4=16 projectors PJ1, PJ2, and others, i.e., m=4 and n=4. Also in such a multi-projection display, with such position adjustment as described in the projection image position adjustment methods of the first to fourth embodiments using a pair of two projectors disposed horizontally or vertically in a row, projection images from every projector can be subjected to position adjustment in a short time with high accuracy.

While the invention has teen described in detail, the foregoing embodiments are in all aspects illustrative and not restrictive. It is understood that numerous other modifications and variations can be devised without departing from the scope of the invention. For example, described in the above embodiments is the case where projection images from the projectors PJ1 and PJ2 are tile-projected on the screen SCR. The tile projection is surely not the only option, and so-called stack projection is also applicable, i.e., protection images from the projectors PJ1 and PJ2 are overlaid on each other in the same projection area.

In the above embodiments, described is an exemplary case where the color of white appears in the overlay area when the two adjustment images are projected with any appropriate positional relationship. The color of white is not the only option for appearance when two adjustment images are overlaid together as long as any predetermined characteristics appear in the overlay area when two adjustment images are projected with any appropriate positional relationship.

Also in the above-described embodiments, a fixed margin is provided in consideration of possible fluctuations caused by the equipment characteristics such as gamma characteristics or lighting condition, and the threshold value for the pixel value is set to "240, 240, 240". This threshold value can be also set to any optimum value depending on the environmental condition including the equipment characteristics, the lighting condition, and others.

In the above-described embodiments, the line interval is set to 20 pixels for the adjustment images CG1 and CG2, and the adjustment images CG3 and CG4. The number of pixels is not restrictive to 20, but is preferably 10 or more.

What is more, as to the calculation of evaluation values, preferably, image capture is performed for a plurality of times while the two adjustment images share the same positional relationship, and evaluation values are calculated using the resulting plurality pieces of image capture data. As such, by calculating evaluation values using image capture data as a result of image capture for a plurality of times, the resulting evaluation values can be highly accurate and less affected by noise of the image capture device. In this case, the evaluation values calculated using image capture data as a result of image capture for a plurality of times are averaged, and thus calculated average value may be used as a final evaluation value.

In the above-described embodiments, described is the case that two of a plurality of projectors are used for position adjustment. This means that at least two projectors are used for position adjustment as a pair, and includes that projection images from a plurality of or plurality pair of projectors are subjected to position adjustments at the same time.

With an exemplary multi-projection display including 2×2=4 projectors, the upper two projectors may be paired, and projection images from the upper pair of projectors may be subjected to position adjustment in the horizontal direction. At the same time, the lower two projectors may be paired, and projection images from the lower pair of projectors may be subjected to position adjustment in the horizontal direction. As such, by simultaneous position adjustment applied to projection images from a plurality or a plurality pair of projectors, when the multi-projection display is configured by a plurality of projectors as shown in FIG. 15, the position adjustment can be performed with efficiency, and the time taken for the position adjustment can be shortened to a considerable degree.

Moreover, the projector described in the above embodiments is exemplified as being a 3 LCD projector with RGB primary colors. The invention is also applicable to a multicolor-type projector with four or more primary colors.

Further, in the above embodiments, the projectors are physically disposed in the horizontal or vertical direction for the aim of placing (projecting) projection images from a plurality of projectors in the horizontal or vertical direction. This is surely not restrictive, and instead of changing the physical positions of the projectors, using the projection position change function, e.g., lens shift, is surely possible.

Still further, in the above embodiments, the adjustment images CG1 and CG2 and the adjustment images CG3 and CG4 are all of a horizontally- or vertically-linear pattern. This is not restrictive, and the adjustment images CG1 and CG2 and the adjustment images CG3 and CG4 may be of various types of patterns as long as the patterns each include a line drawing.

Figure 16A:
FIGS. 16A to 16D are all a diagram showing first modified pattern examples of an adjustment image.
Figure 16B:
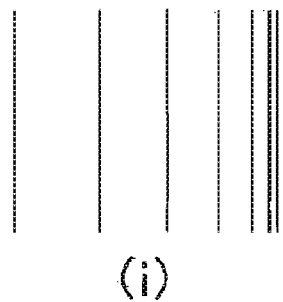
Figure 16B:
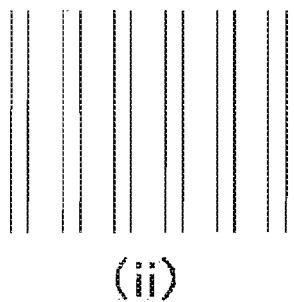
Figure 16C:
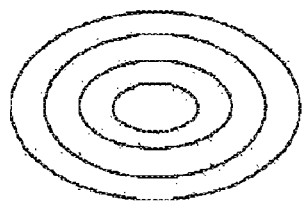
Figure 16C:
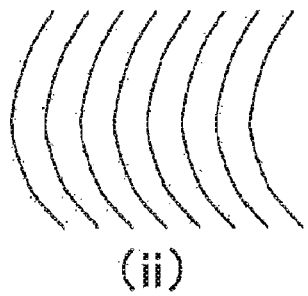
Figure 16D:
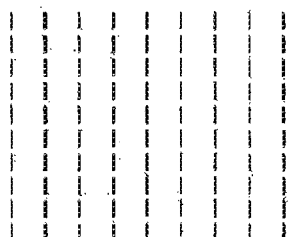
Figure 17A:
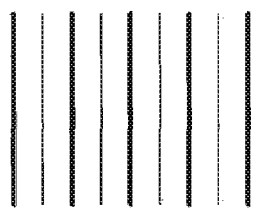
FIGS. 17A to 17E are all a diagram showing second modified pattern examples of an adjustment image.
Figure 17B:
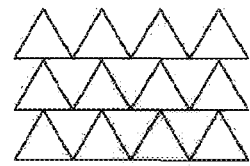
Figure 17C:
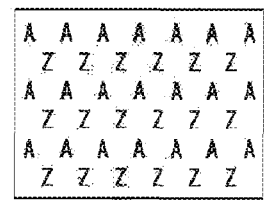
Figure 17D:
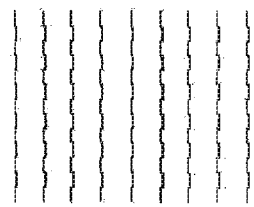
Figure 17E:
Figure 18A:
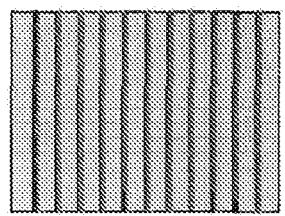
FIG. 18A to 18C are all a diagram showing third modified pattern examples of an adjustment image.
Figure 18B:
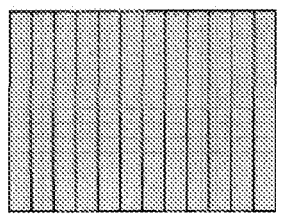
Figure 18C:
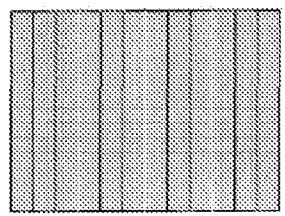

FIGS. 16A to 16D are all a diagram showing first modified pattern examples of an adjustment image, FIGS. 17A to 17E are all a diagram showing second modified pattern examples of an adjustment image, and FIG. 18A to 18C are all a diagram showing third modified pattern examples of an adjustment image.

Specifically, FIG. 16A shows an exemplary adjustment image of a sloped linear pattern. In FIG. 16B, (i) and (ii) each show an exemplary adjustment image of a pattern with a periodicity for line intervals. In FIG. 16C, (i) and (ii) each show an exemplary adjustment image of a curved pattern. FIG. 16D shows an exemplary adjustment image of a dashed-line pattern.

FIG. 17A shows an exemplary adjustment image of a pattern with a periodicity for line thickness, FIG. 17B shows an exemplary adjustment image of a graphic pattern, and FIG. 17C shows an exemplary adjustment image of a text pattern. FIG. 17D shows an exemplary adjustment image of a pattern with variations in adjacent line length or design, and FIG. 17E shows an exemplary adjustment image of an illustration pattern.

FIG. 18A shows an exemplary adjustment image of a pattern with lines showing color gradation, FIG. 18B shows an exemplary adjustment image of a pattern with lines showing a color change in the vertical direction, and FIG. 18C shows an exemplary adjustment image of a pattern with lines in which any adjacent lines are different in color.

Other than the exemplary adjustment images of FIGS. 16A to 18C, the adjustment images may be of various types of pattern, e.g., color-inverted, color-changed on the time axis, shape-changed on the time axis, or others, or combination of patterns of FIG. 12A to 14 will also do, for example.

A projection image position adjustment program may be created with the process procedure for implementing the invention, and the resulting program may be recorded on various types of recording medium. Accordingly, the invention is also directed to a recording medium recorded with the projection image position adjustment program. Alternatively, the projection image position adjustment program may be acquired over a network.

What is claimed is:

1. A projection image position adjustment method of applying position adjustment to two projection images using two adjustment images, the two projection images being projected on a projection surface to have an overlay area by two of a plurality of projectors in a multi-projection display, the method comprising:

providing, to the two projectors, two adjustment image data respectively corresponding to the two adjustment images, each showing a pattern of specific characteristics in the overlay area when the two adjustment images are projected with an appropriate positional relationship;

calculating an evaluation value correlated to the characteristics based on image capture data that is derived by capturing an image of the projection surface with the two adjustment images projected thereon by the two projectors; and subjecting the two projection images to the position adjustment based on the evaluation value, wherein the characteristics being of a pixel value in the image capture data, the evaluation value being a number of pixels having the pixel value of a threshold value or larger, and the subjecting including subjecting the two projection images to the position adjustment based on optimum projection positions of the two projection images at which the number of pixels having the pixel value of the threshold value or larger is the largest.

2. The projection image position adjustment method according to claim 1, the calculating including, after at least one of the two adjustment images is moved in a horizontal or vertical direction on a pixel-by-pixel basis, calculating the evaluation value every time the adjustment image is moved on the pixel-by-pixel basis.

3. The projection image position adjustment method according to claim 1, the pattern being of a line drawing with a width corresponding to a pixel.

4. The projection image position adjustment method according to claim 1, further including setting the threshold value to a value corresponding to a color that firstly appears when the patterns of the two adjustment images are overlaid on each other.

5. The projection image position adjustment method according to claim 4, one of the two adjustment images having a first pattern of a first color, and the other adjustment image having a second pattern of a second color, and further including setting each of the first and second colors with values for a red component, a green component, and a blue component in the two adjustment images to derive a color of white when the first and second patterns are overlaid on each other.

6. The projection image position adjustment method according to claim 5, in the first color, the intensity of the red component is high, and the intensity of the green component is low, and in the second color, the intensity of the blue component is high, and the intensity of the green component is low.

7. The projection image position adjustment method according to claim 1, the calculating including calculating the evaluation value by performing image capture for a plurality of times in a state that the two adjustment images share the same positional relationship.

8. The projection image position adjustment method according to claim 1, the subjecting including subjecting the two projection images to the position adjustment by moving, on a pixel-by-pixel basis, an effective image display area of an image formation area in an electrooptic modulator provided to either of the two projectors.

9. A projection image position adjustment device for applying position adjustment to two projection images using two adjustment images, the two projection images being projected on a projection surface to have an overlay area by two of a plurality of projectors in a multi-projection display, the device comprising:

an adjustment image data output device that is capable of outputting, to the two projectors, two adjustment image data respectively corresponding to the two adjustment images, each showing a pattern of specific characteristics in the overlay area when the two adjustment images are projected with an appropriate positional relationship;

an image capture device that is capable of capturing the two adjustment images projected on the projection surface;

an evaluation value calculation device that calculates an evaluation value correlated to the characteristics based on image capture data that is derived by the image capture device capturing an image of the projection surface with the two adjustment images projected thereon by the two projectors; and a position adjustment control device that subjects the two projection images to the position adjustment based on the evaluation value, wherein the characteristics being of a pixel value in the image capture data, the evaluation value being a number of pixels having the pixel value of a threshold value or larger, and the position adjustment control device including the two projection images to the position adjustment based on optimum projection positions of the two projection images at which the number of pixels having the pixel value of the threshold value or larger is the largest.

10. A projection image position adjustment program of applying position adjustment to two projection images using two adjustment images, the two projection images being projected on a projection surface to have an overlay area by two of a plurality of projectors in a multi-projection display, the program being recordable on a computer readable recording medium and comprising:

instructions for providing, to the two projectors, two adjustment image data respectively corresponding to the two adjustment images, each showing a pattern of specific characteristics in the overlay area when the two adjustment images are projected with an appropriate positional relationship;

instructions for calculating an evaluation value correlated to the characteristics based on image capture data that is derived by capturing an image of the projection surface with the two adjustment images projected thereon by the two projectors; and instructions for subjecting the two projection images to the position adjustment based on the evaluation value, wherein the characteristics being of a pixel value in the image capture data, the evaluation value being a number of pixels having the pixel value of a threshold value or larger, and the instructions for subjecting the two projection images to the position adjustment based on optimum projection positions of the two projection images at which the number of pixels having the pixel value of the threshold value or larger is the largest.

11. A multi-projection display device capable of projecting, on a projection surface, projection images to have an overlay area, the display device comprising:

a plurality of projectors that project the projection images;

an adjustment image data output device that is capable of outputting, to two of the plurality of projectors, when two adjustment images projected by any two of the projectors are projected with an appropriate positional relationship, two adjustment image data respectively corresponding to the two adjustment images, each showing a pattern of specific characteristics in the overlay area;

an evaluation value calculation device that calculates an evaluation value correlated to the characteristics based on image capture data that is derived by capturing an image of the projection surface with the two adjustment images projected thereon by the two projectors; and a position adjustment control device that subjects the two projection images to the position adjustment based on the evaluation value, wherein the characteristics being of a pixel value in the image capture data, the evaluation value being a number of pixels having the pixel value of a threshold value or larger, and the position adjustment control device including the two projection images to the position adjustment based on optimum projection positions of the two projection images at which the number of pixels having the pixel value of the threshold value or larger is the largest.

12. The multi-projection display according to claim 11, the projection images from the projectors being configured to be ready for tile projection to have the overlay area on the projection surface.

13. The multi-projection display according to claim 11, the projection images from the projectors being configured to be ready for stack projection to have the overlay area on the projection surface.

* * * * *